United States Patent [19]

Barnett et al.

[11] Patent Number: 4,613,512
[45] Date of Patent: Sep. 23, 1986

[54] EDIBLE MATERIAL CONTAINING M-AMINOBENZOIC ACID OR SALT

[75] Inventors: Ronald E. Barnett, Suffern; Ronald G. Yarger, Pearl River, both of N.Y.

[73] Assignee: General Foods Corporation, White Plains, N.Y.

[21] Appl. No.: 673,812

[22] Filed: Nov. 21, 1984

Related U.S. Application Data

[63] Continuation-in-part of Ser. No. 430,540, Sep. 30, 1982, abandoned, which is a continuation-in-part of Ser. No. 274,035, Jun. 15, 1981, abandoned.

[51] Int. Cl.$^4$ ............................................. A23L 1/236
[52] U.S. Cl. .................................. 426/548; 426/658; 514/777; 514/788; 424/49
[58] Field of Search ............... 426/548, 658; 514/788, 514/777; 424/49

[56] References Cited

U.S. PATENT DOCUMENTS 3,876,816  4/1975  Zaffaroni ........................... 426/548

OTHER PUBLICATIONS

Moncrieff, The Chemical Senses, 1944, Leonard-Hill: London, p. 253.
Jacobs, The Chemistry & Technology of Food & Food Products, vol. I, 1951, Interscience Publishers: New York, p. 32.
Belitz et al., "Sweet & Bitter Compounds: Structure & Taste Relationship", Food Taste Chemistry, ACS Series 115, ACS: Wash., D.C., pp. 93-131 (1979).

*Primary Examiner*—Joseph Golian
*Attorney, Agent, or Firm*—Linn I. Grim; Thomas A. Marcoux; Daniel J. Donovan

[57] ABSTRACT

Edible material comprising a sweetener and a sweetness modifying agent, namely m-aminobenzoic acid, and processes for modifying the sweetness perception and reducing the sweetness content of an edible material having a pH of 2 to 5.5 are disclosed.

16 Claims, 4 Drawing Figures

EDIBLE MATERIAL CONTAINING M-AMINOBENZOIC ACID OR SALT

CROSS REFERENCE TO RELATED APPLICATIONS

The present application is a continuation-in-part of U.S. patent application Ser. No. 430,540 filed Sept. 30, 1982 now abandoned, which is a continuation-in-part of U.S. patent application Ser. No. 274,035 filed June 15, 1981, now abandoned, both of which are incorporated herein by reference.

BACKGROUND OF THE INVENTION

This invention relates generally to sweetness modification and more particularly to low-caloric compounds, particularly well suited as sweetness modifiers for edible material.

Sweetness is one of the primary taste cravings of both animals and humans. Thus, the utilization of sweetening agents in foods in order to satisfy this sensory desire is well established.

Naturally occurring carbohydrate sweeteners, such as sucrose, are still the most widely used sweetening agents. While these naturally occurring carbohydrates, i.e. sugars, generally fulfill the requirements of sweet taste, the abundant usage thereof does not occur without deleterious consequences, e.g. high caloric input. In fact, often times the level of these sweeteners required to satisfy taste in ingesta is far higher than that level of sweetener which is desired for economic, dietetic or other functional considerations.

In an attempt to eliminate the disadvantages concomitant with natural sweeteners, considerable research and expense have been devoted to the production of artificial sweeteners, such as for example, saccharin, cyclamate, dihydrochalcone, aspartame, etc. While some of these artificial sweeteners satisfy the requirements of sweet taste without caloric input and have met with considerable commercial success, they are not, however, without their own inherent disadvantages. For example, many of these artificial sweeteners have the disadvantages of high cost of production, as well as delay in perception of the sweet taste, persistent lingering of the sweet taste, and very objectionable bitter, metallic after-taste when used in food products.

Since it is believed that many of the disadvantages of artificial sweeteners, particularly after-taste, are a function of the concentration of the sweetener, it has been previously suggested that these effects could be reduced or eliminated by combining artificial sweeteners, such as saccharin, with other ingredients or natural sugars, such as pectin, sorbitol, dextrose, maltose, etc. These combined products, however, have not been entirely satisfactory either. Some U.S. patents which disclose sweetener mixtures include, for example, U.S. Pat. No. 4,228,198, U.S. Pat. No. 4,158,068, U.S. Pat. No. 4,154,862, U.S. Pat. No. 3,717,477.

More particularly, U.S. Pat. No. 4,228,198 discloses a sweetening composition comprised of a protein sweetener, saccharin or cyclamate in combination with a sweetness modifier, namely arabinogalactan.

The patentee states that the arabinogalactan enhances the overall sweetness of the composition and reduces or eliminates the after taste.

U.S. Pat. No. 4,158,068 discloses a sweetener mixture having an improved saccharose-like taste consisting of acetosulfame and at least one sweetener from the group of aspartyl peptide esters, the sulfamate sweeteners, the sulfimide sweeteners and dihydrochalcone sweeteners.

Mixtures of artificial sweeteners, such as saccharin and the like, and neodiosmin are disclosed, in U.S. Pat. No. 4,154,862, to be of reduced bitterness and after taste while U.S. Pat. No. 3,717,477 discloses that the sweetening potency and taste of sodium saccharin are improved by the addition of small amounts of optically active D-tryptophan.

The use of sweetening agents in foods to provide functions other than sweetening, such as to act as fillers, bulking agents, antimicrobial agents, freezing point depressants, stabilizers, carriers, etc. is also well established. For example, U.S. Pat. No. 3,597,236 discloses the optional use of dextrose, in less than sweetening amounts, as a carrier to provide a more uniform distribution of a preserving composition in and on meat. The preserving composition comprises ascorbic acid, a compound selected from the group consisting of para-aminobenzoic acid, m-aminobenzoic acid, isonicotinic acid and N-ethyl-nicotinamide. Moreover, while J. Prakt. Chemie, Vol. 36, pp. 93–107 (1847) and Moncrieff, *The Chemical Senses,* pp. 252–253 (1944) disclose m-aminobenzoic acid to be sweet, the literature does not disclose or remotely suggest that this compound would be an excellent foodstuff sweetener, particularly when employed in combination with sweetening amounts of known natural and/or artificial sweeteners.

Other references disclose certain organic compounds to be sweet. Belitz et al., Sweet and Bitter Compounds: Structure and Taste Relationship, *Food Taste Chemisty,* ACS Symposium Series 115, Edited by James C. Bourdreau, pp. 93, 14–115 (1979) disclose m-aminobenzoic acid to have a threshold sweetness concentration of 8–10 millimoles/liter. This reference does not disclose or suggest that this compound would be an excellent foodstuff sweetener when employed in combination with sweetening amounts of know natural and/or artificial sweeteners.

Furthermore, it is well known that enormous quantities of sweeteners are utilized in beverages, particularly commercial soft drinks and dessert products, for example, gelatins. Since many of these beverages and desserts have an acidic pH, not only must the sweetener employed therein be acid stable, but it also must be effective under acid pH conditions. In the case of sweeteners such as sucrose and saccharin, it is known that sweetening potency is generally decreased in acidic systems. Thus, in these acidic products such as, for example, carbonated beverages, etc., it is necessary to utilize relatively large quantities of these sweeteners to achieve the desired level of sweetness. These large quantities of sweetner are often times far higher than the level of sweetener desired for economic, nutritional or other functional considerations.

In view of the aforementioned disadvantages associated with the use of known sweeteners, i.e., naturally occurring, artificial or combinations thereof, it becomes readily apparent that it would be highly desirable to provide a sweetness modifying agent which when added to foodstuffs can greatly reduce the level of deleterious sweetener normally required and concomitantly eliminate or greatly diminish the numerous disadvantages associated with prior art sweeteners.

SUMMARY OF THE INVENTION

Figure 1:
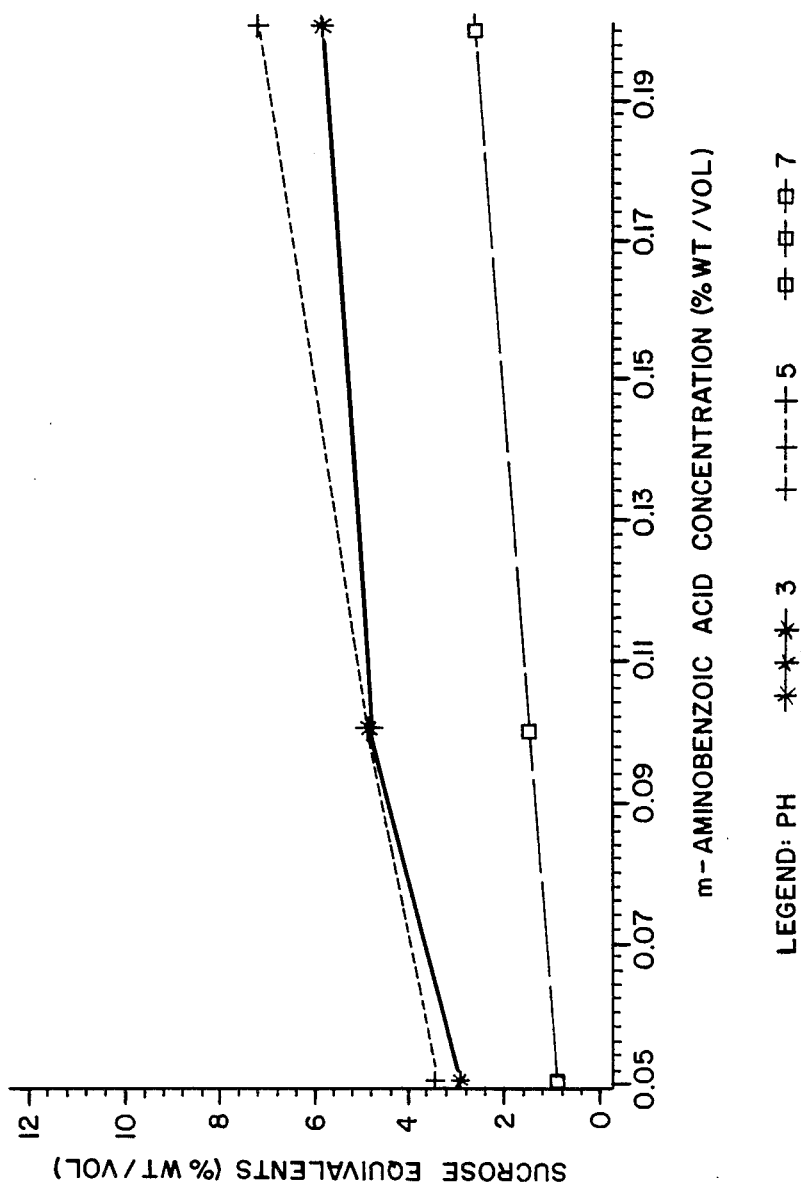
FIG. 1 is a graphical representation plotting the sweetness m-aminobenzoic acid, in comparison to sucrose, as a function of concentration at varied levels of pH.

This invention pertains to an edible material, e.g., foodstuff, containing 0.01 to 0.4% weight m-aninobenzoic acid or non-toxic salts thereof and another food acceptable sweetener in sweetening amounts wherein the material has a pH of 2.0 to 5.5. It has been found that when m-aminobenzoic acid or salts thereof is used in edible material having a pH of 2.0 to 5.5 the sweetening effect from m-aminobenzoic acid is large at these pH's and thus the amount of other sweetener in the edible material can be greatly reduced.

DETAILED DESCRIPTION OF THE INVENTION

Thus, according to the present invention, it has been found that m-aminobenzoic acid and/or its food acceptable, non-toxic salts are effective sweetness modifying agents when used in combination with sweetening amounts of other natural and/or artificial food acceptable sweeteners, including for example, sucrose, fructose, corn syrup solids, high fructose corn syrup, dextrose, xylitol, sorbitol, mannitol, acetosulfam, thaumatin, invert sugar, saccharin, thiophene saccharin, cyclamate, chlorosucrose, dihydrochalcones, hydrogenated glucose syrups, aspartame (L-aspartyl-L-phenylalanine methyl ester) and other dipeptides, glycyrrhizin, stevioside and the like.

To achieve the desired results of the present invention, the utilization of only small quantities of m-aminobenzoic acid or its non-toxic salts are necessary. For example, depending on the particular edible material and sweetener, the m-aminobenzoic acid is generally added to the edible material in sweetness modifying amounts. These amounts are generally in the range of from about 0.01 to about 0.4 weight percent, and preferably from about 0.05 to about 0.2 weight percent, based on the consumed weight of the edible material. It is to be understood that these afore-described amounts of m-aminobenzoic acid are based on the consumed weight of the edible material. Thus, the amounts employed in a product, for example, a dry beverage mix, prior to taking its consumed form by the addition of diluents or solvents such as water, will necessarily vary accordingly in the preconsumed form of the edible material. For example, in a pre-mix edible material comprising m-aminobenzoic acid or its salts the m-aminobenzoic acid or its salts are present in the diluted edible material in an amount, for example, in the range of from about 0.01 to about 0.4 percent by weight of the diluted edible material. By diluent or solvent herein, solid or liquid additives such as water, carbonated water, milk, alcohol, eggs, food-acceptable sweeteners as hereinbefore defined and like are contemplated. Pre-mix edible material, e.g., foodstuffs contemplated herein include, for example, dry mix and liquid foodstuffs and concentrates such as, for example, instant mix flavored beverages, instant mix gelatins and puddings, cake mixes, liquid beverages concentrates and the like. Furthermore, these afore-described sweetness modifying amounts are based on the free acid, namely m-aminobenzoic acid. Thus, in the event salts of this acid are utilized the amount of the salt employed in the foodstuff should be at least sufficient to provide the afore-described amounts of the acid.

For purposes of the present invention, the edible material referred herein comprises oral edible material i.e., edible material taken into the system through the oral cavity and includes typical foodstuffs, as well as pharmaceutical preparations, in which the m-aminobenzoic acid or salts thereof of the present invention may be used as a sweetness modifier. These edible material are for example, beverages, including soft drinks, carbonated beverages, ready-to-mix beverages and the like, infused foods (e.g., fruits or vegetables), sauces, condiments, salad dressings, juices, syrups, desserts, including puddings, gelatin and frozen desserts, like ice creams, sherbets, icings and flavored frozen desserts on sticks, confections, cereals, baked goods, chewing gum, moisture foods (e.g., dog foods, and cat food) animal food in general, including pet food; medicaments, toothpaste, mouthwashes and the like.

As indicated hereinbefore, the m-aminobenzoic acid is utilized in the edible material compositions having a pH from about 2 to 5.5. Unlike other sweeteners, such as sucrose and saccharin, it has been found that m-aminobenzoic acid is most effective as a sweetness modifier in edible material compositions having a pH from about 2.0 to 5.5.

Furthermore, as stated hereinbefore, the results of the present invention are provided when the sweetness modifying agent, namely m-aminobenzoic acid or its non-toxic salts, is employed in combination with a sweetener, such as those hereinbefore recited, in sweetening amounts. It is, of course, understood that when a mixture of sweeteners is utilized, it is not necessary that each sweetener be present in sweetening amounts provided that the sweetener mixture results in a sweetening amount.

Thus, for the purposes of this invention, best results are obtained when the m-aminobenzoic acid is employed in the edible material in combination with a sweetener, wherein the sweetener is present in amounts of above about 1 weight percent of sucrose equivalents. Preferably the sweetener content is in the range of from about 1 weight percent to about 25 weight percent sucrose equivalents and most preferably 3 weight percent to about 15 weight percent sucrose equivalents. Thus, wherein the sweetener is, for example, saccharin, the amounts of saccharin which correspond to the afore-recited sucrose equivalents are above about 0.007, preferably from about 0.007 to about 0.08 weight percent, and most preferably from about 0.013 to about 0.05 weight percent. These values for aspartame are from above about 0.013, preferably about 0.013 to about 0.17, and most preferably about 0.03 to about 0.1. Sucrose equivalents for other known sweeteners are readily known or are easily determined. For example, the amount of a sweetener which is equivalent to 10 weight percent sucrose can be determined by having a panel taste a solution of sweetener and match its sweetness to a 10 weight percent solution of sucrose. Obviously, sucrose equivalents for other than 10 weight percent sucrose are determined by matching the appropriate sucrose solutions.

For purposes herein the combination of sweetness modifier and sweetener should provide a total edible material sweetness of above about 3 weight percent, preferably from about 3 weight percent to about 40 weight percent, and more preferably from about 6 weight percent to about 16 weight percent sucrose equivalents.

Figure 2:
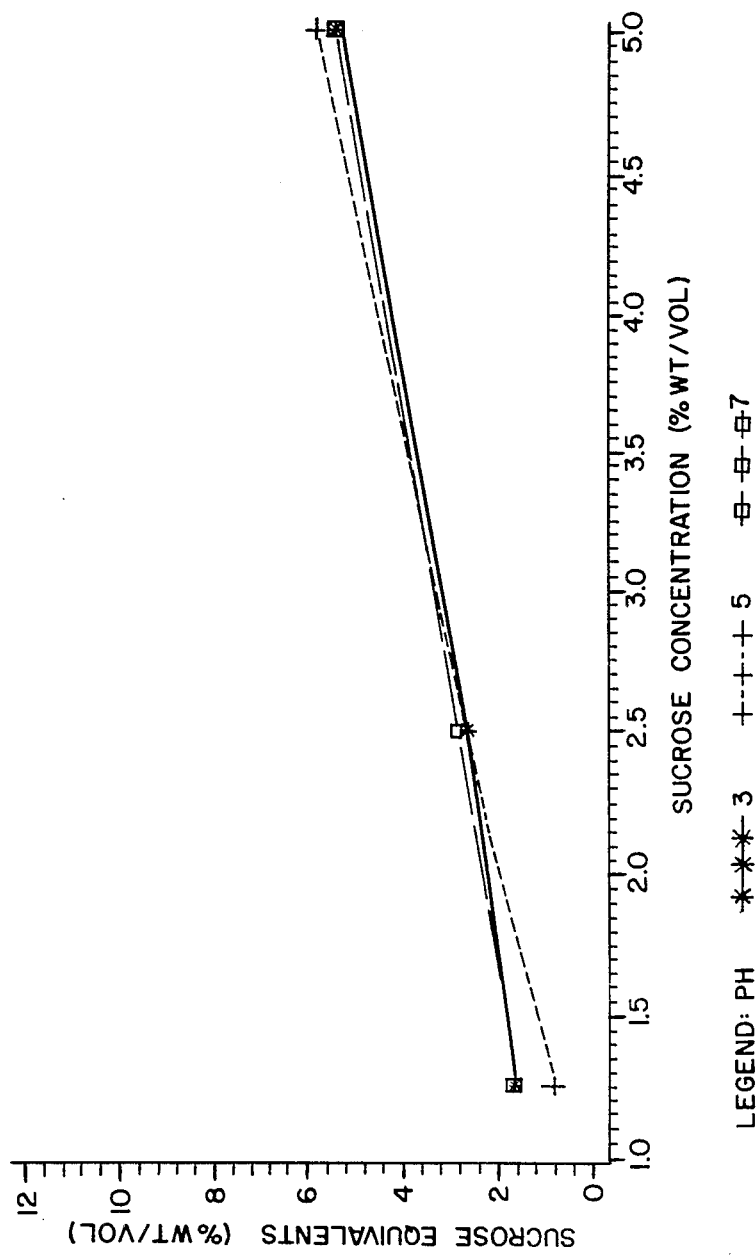
FIG. 2 is a graphical representation plotting the sweetness of sucrose as a function of concentration at varied levels of pH, in comparison to itself.
Figure 3:
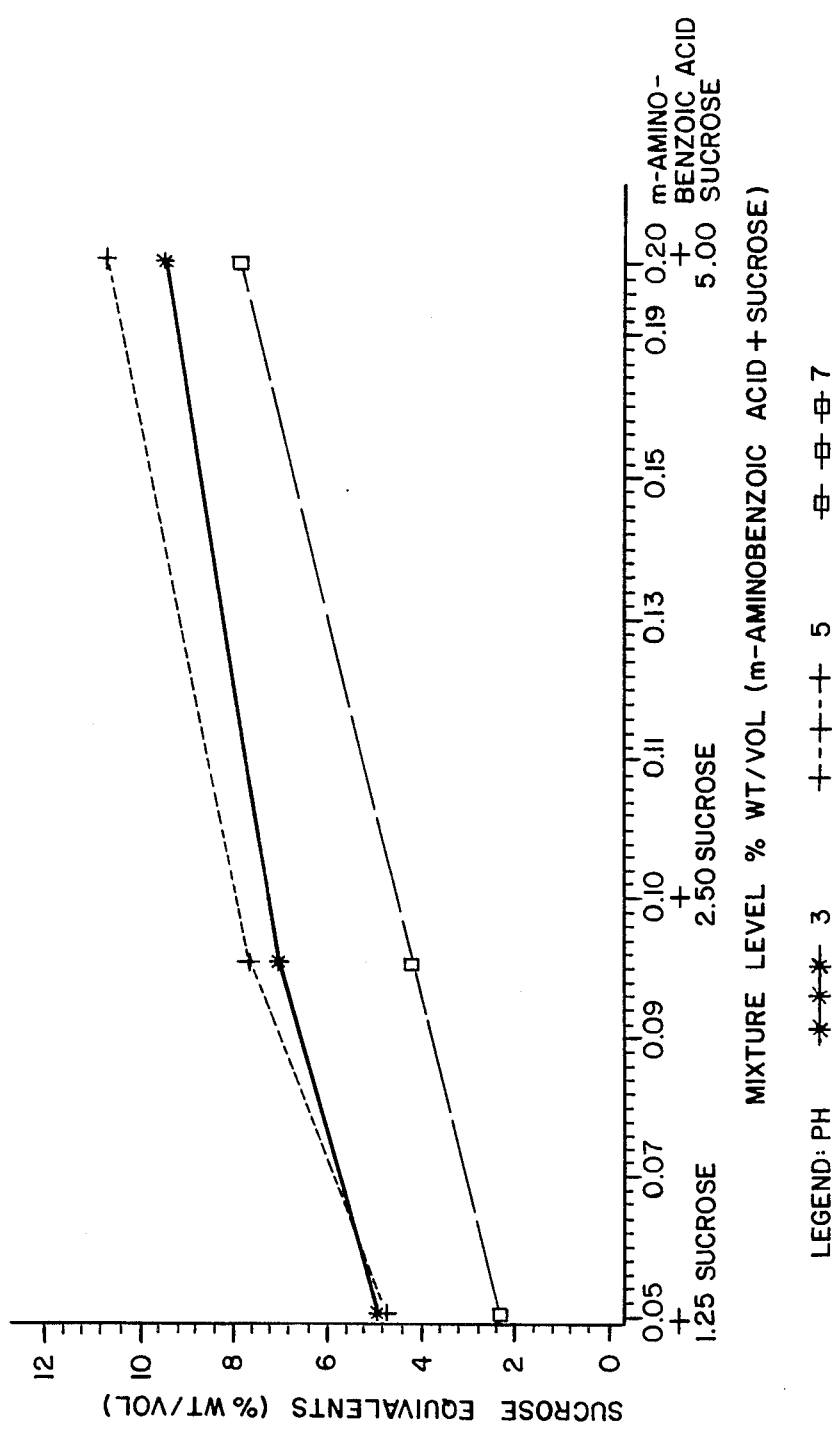
FIG. 3 is further graphical representation plotting the sweetness of mixtures of m-aminobenzoic acid and sucrose, in comparison to sucrose, as a function of concentration at varied pH levels.

Referring to the drawings herein in more detail, FIGS. 1–4 graphically illustrate the results of the present invention. That is, FIG. 1 is a plot of the sweetness of aqueous m-aminobenzoic acid solutions in comparison to aqueous sucrose solutions (pH of the sucrose solutions adjusted to the pH of the m-aminobenzoic acid solutions) as a function of concentration at various pH levels. FIG. 2 is a similar plot for sucrose, comparing it to itself as a control. FIG. 1 shows that unlike sucrose, m-aminobenzoic acid exhibits higher potency in an acidic environment. For example, at pH 3 or 5 and at a concentration of 0.1 weight percent, m-aminobenzoic acid provides a sucrose equivalency of more than twice that of which it provides at pH 7 at the same concentration. Furthermore, FIG. 3 illustrates that an aqueous solution, for example, containing a mixture of 0.1 weight percent m-aminobenzoic acid and 2.5 weight percent sucrose at pH 7 has the equivalent sweetness of about 4.3 percent sucrose, while the same mixture of m-aminobenzoic acid and sucrose at pH 3 has a sucrose equivalency of about 7.1 weight percent and at a pH 5 of about 7.7 weight percent. These data clearly show that m-aminobenzoic acid has greater sweetness potency in an acidic environment.

Figure 4:
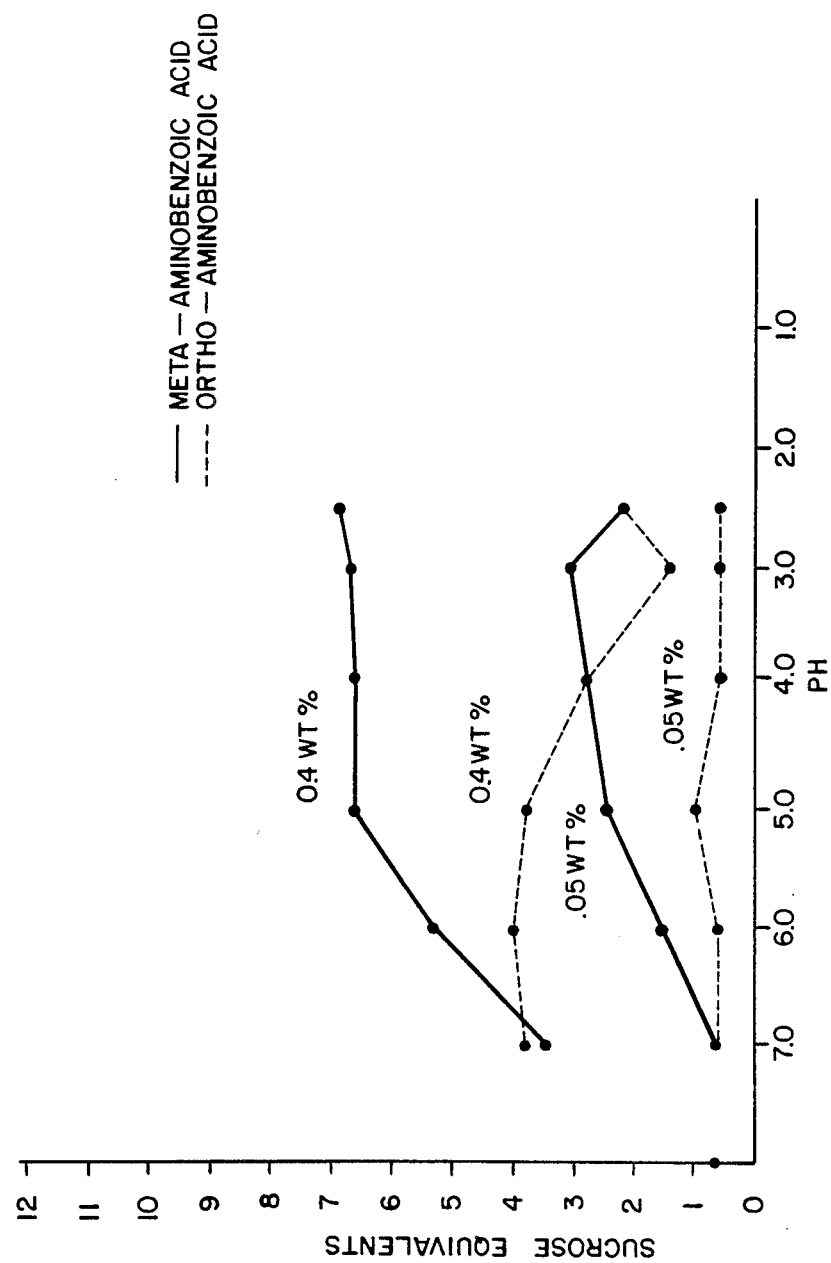
FIG. 4 is a graphical representation plotting the sweetness of m-aminobenzoic acid and o-aminobenzoic acid, in comparison to sucrose, each at 0.4% by weight and 0.05% by weight concentration at varied pH levels.

The data illustrated by FIG. 4 indicate that as pH decreases, the perceived sweetness of m-aminobenzoic acid increases. Ordinarily, as the acidity of a food increases (decrease of pH) the perceived sweetness decreases whereas with the present invention the opposite occurs. The degree of perceived sweetness of sour tasting or acidic foods ordinarily is not increased by increasing the acidity. The sweetening agent of the present invention, m-aminobenzoic acid and its food acceptable salts was, however, found to function in this way, whereas o-aminobenzoic acid did not. In fact, o-aminobenzoic acid gave expected results, namely, an increase in acidity lessened the perceived sweetness of this compound.

In addition, the advantageous results of the present invention are further evidenced by a comparison of FIGS. 2 and 3. That is, FIG. 3 shows, for example, that at pH levels of 3 and 5, a mixture, for instance, of 0.1 percent m-aminobenzoic acid and 2.5 percent sucrose solution is sweeter than a solution containing 5 percent sucrose as the sole sweetener, as illustrated by FIG. 2. Thus, it is readily apparent from these data that the utilization of m-aminobenzoic acid in foodstuffs allows for a significant reduction in the amounts of caloric and expensive sweetener, such as sucrose, ordinarily required, yet still achieving the desired level of sweetness in the foodstuff.

Generally, the data illustrated by FIGS. 1 to 3 were obtained by preparing aqueous solutions either of m-aminobenzoic acid, (0.5, 0.10, 0.20 percent), sucrose (1.25, 2.50, 5.00, 10.00 percent), and mixtures of m-aminobenzoic acid and sucrose (0.5 and 1.25, 0.10 and 2.50, 0.20 and 5.00 percent, respectively) at pH levels of 3, 5, and 7. The pH of each of the solutions was adjusted and maintained by the addition of conventional acids and/or bases, such as HCl or NaOH, and buffering agents such as citric acid and potassium citrate. The solutions were matched for sweetness to 1 to 14 sucrose solutions ranging in concentration from 0 to 13 percent in 1 percent increments. Each of 18 subjects participated in 3 test sessions, one for each of the pH conditions. Within a session, all test solutions and sucrose standards were at the same pH, either 3, 5, or 7. All testing used a sip and spit procedure and was done double-blind. The data were analyzed by an analysis of variance.

Generally, the data illustrated by FIG. 4 was obtained by preparing aqueous solutions of m-aminobenzoic acid (0.05, 0.4 percent) and o-aminobenzoic acid (0.05, 0.4 percent) at pH levels of 2.5, 3, 4, 5, 6 and 7. The pH of each of the solutions was adjusted and maintained by the addition of conventional acids and/or bases such as HCl or NaOH, and buffering agents such as citric acid potassium citrate. The solutions were matched for sweetness to 1 of 13 sucrose solution ranging in concentration from 0 to 12 percent in 1 percent increments. Each of 5 subjects participated in 6 test sessions, one for each of the pH conditions. Within a session, all test solutions and sucrose standards were at the same pH. All testing used a sip and spite procedure and was done blind.

The same panel also tested m-aminobenzoic acid and o-aminobenzoic acid at a concentration of 0.01 weight percent at pH's of 3 and 4 using the above described procedure. It was found that o-aminobenzoic acid was not sweet while m-aminobenzoic was threshold sweet.

The m-aminobenzoic acid of the present invention can be radily prepared according to well known synthetic procedures or can be obtained commercially, (e.g. from Pfaltz and Bauer). For purposes of optimization, it has been found advantageous to utilize about a 99 percent pure material. A simple procedure for obtaining a material of this purity is, for example, to add the m-aminobenzoic acid, with stirring, to boiling distilled water. When no solid material remains visible, granulated charcoal (food approved) is added to the solution and the mixture is stirred further. The resultant mixture is then hot filtered and slowly recrystallized at, for example, about 45°–50° F. The resultant m-aminobenzoic acid has a purity of about 99 percent.

Furthermore, as stated hereinbefore, food acceptable, non-toxic salts of m-aminobenzoic acid are also contemplated herein. These slats include, sodium, potassium, calcium, magnesium, ammonium and the like and may be preformed or formed in-situ in the foodstuff by reaction with typical buffering agents, such as sodium citrate, potassium citrate, citric acid, sodium acetate, acetic acid, calcium phosphate, such as monocalcium phosphate and tricalcium phosphate, phosphoric acid and the like which are also normally employed in foodstuffs to provide the desired pH. It has been found that when the calcium salt is employed the rate of solubility in an aqueous medium is greatly increased.

Sweetening compositions comprised of m-aminobenzoic acid or its salts and a sweetener, such as sucrose, saccharin, aspartame (or mixtures) and the like are also contemplated herein. These sweetening compositions may be preformed, formulated and packaged, for example, so that they can be readily added to a foodstuff to provide the hereinbefore-noted advantages. Moreover, these sweetening compositions may be added to foodstuffs which do not contain sweetener as well as to foodstuffs containing sweetener.

In order that those skilled in the art may better understand how the present invention may be practiced, the following examples are given by way of illustration.

EXAMPLE 1

As a control, an orange flavored beverage is prepared by mixing 12.6 gms unsweetened Tang TM instant beverage base mix with 875 gms of water and 115.4 gms (11.5 wt.%) sucrose. The Tang TM base contains a citric acid (6.6 gms) and potassium citrate (0.7 gms) buffer. The final aqueous mixture has a pH of about 3.0

For comparative purposes, a further orange flavored beverage is prepared by mixing 875 gms of water, 12.6 gms of the same unsweetened Tang TM base mix as in the control and 46.16 gms sucrose (4.9 wt.%, which is 40% of the sucrose utilized in the control). The formulation has a pH of about 3.0.

For further comparison, another orange flavored beverage is prepared by mixing 875 gms of water, 12.6 gms of the same unsweetened Tang TM base mix, 46.16 gms sucrose (4.9 wt.%, 40% of the sucrose in the control) and 1.87 gms (0.2 wt.%) of purified m-aminobenzoic acid. This formulation has a pH of about 3.2.

For additional comparison, a further orange flavored beverage is prepared by mixing 875 gms of water, 11.4 gms unsweetened Tang TM base, 46.16 gms sucrose (4.9 wt.%, 40% of the sucrose in the control) and 1.87 gms (0.2 wt.%) purified m-aminobenzoic acid. In this formulation the citric acid in the unsweetened base is reduced to 5.5 gms (18% reduction) which is advantageously compensated for by the addition of the m-aminobenzoic acid. The pH of this formulation is about 3.2.

In evaluating and comparing the sweetness of the afore-described orange flavored beverage compositions, tasters assessed the sweetness of the beverages containing the 0.2 wt.% m-aminobenzoic acid and 40% of the sucrose used in the control to be as sweet as the 100% sucrose control composition as well as having acceptable quality. The same tasters assessed the 40% sucrose containing beverage with no m-aminobenzoic acid to be unacceptable.

EXAMPLE 2

As a control, an orange flavored beverage is prepared by mixing 6.3 gms unsweetened Tang TM instant beverage base mix with 438 gms of water and 57.7 gms (11.5 wt. %) sucrose. The Tang TM base contains a citric acid and potassium citrate buffer. The final aqueous mixture has a pH of about 3.0.

For comparative purposes, a further orange flavored beverage is prepared by mixing 438 gms of water, 6.3 gms of the same unsweetened Tang TM base mix as in the control, 43.3 gms sucrose (8.9 wt.%, which is 75% of the sucrose utilized in the control), and 0.24 gms (0.05 wt.%) m-aminobenzoic acid. The formulation has a pH of about 3.0.

For further comparison another orange flavored beverage is prepared by mixing 438 gms of water, 6.3 gms of the same unsweetened Tang TM base mix, 34.6 gms sucrose (7.2 wt.%, 60% of the sucrose in the control) and 0.72 gms (0.15 wt.%) of purified m-aminobenzoic acid. This formulation has a pH of about 3.1.

For additional comparison, a further orange flavored beverage is prepared by mixing 438 gms of water, 6.3 gms of the same unsweetened Tang TM base, 17.3 gms sucrose (3.7 wt.%, 30% of the sucrose in the control) and 1.85 gms (0.4 wt.%) purified m-aminobenzoic acid. The pH of this formulation is about 3.3.

In evaluating and comparing the sweetness of the afore-described orange flavored beverage compositions, tasters assessed the sweetness of the beverages containing the m-amino-benzoic acid and reduced sucrose to be as sweet as the 100% sucrose control composition as well as having acceptable quality.

EXAMPLE 3

As a control, a cherry flavored beverage is prepared by mixing 1.48 gms of an unsweetened cherry flavored instant beverage base mix with 438 gms of water and 0.33 gms (0.075 wt.%) aspartame (APM). The base contains a malic acid and monocalcium phosphate buffer. The final aqueous mixture has a pH of about 3.0.

For comparative purpose, a further cherry flavored beverage is prepared by mixing 438 gms of water, 1.48 gms of same unsweetened base mix as in the control, 0.25 gms APM (0.057 wt.% which is 75% of the APM utilized in the control), and 0.22 gms (0.05 wt.%) purified m-aminobenzoic acid. The formulation has a pH of about 3.2.

For further comparison, another cherry flavored beverage is prepared by mixing 438 gms of water, 1.48 gms of the same unsweetened base mix, 0.20 gms APM (0.045 wt.%, 60% of the APM in the control) and 0.66 gms (0.15 wt.%) of purified m-aminobenzoic acid. The formulation has a pH of about 3.3.

For additional comparative purposes, a further cherry flavored beverage is prepared by mixing 438 gms of water, 1.48 gms of same unsweetened base mix as in the control, 0.13 gms APM (0.029 wt.% which is 40% of the APM utilized in the control), and 0.88 gms (0.20 wt.%) purified m-aminobenzoic acid. The formulation has a pH of about 3.4.

For further comparison, another cherry flavored beverage is prepared by mixing 438 gms of water, 1.48 gms of the same unsweetened base mix, 0.10 gms APM (0.023 wt.%, 30% of the APM in the control) and 1.76 gms (0.40 wt.%) of purified m-aminobenzoic acid. The formulations has a pH of about 3.6.

In evaluating and comparing the sweetness of the afore-described cherry flavored beverage compositions, tasters assessed the sweetness of the beverages containing the m-aminobenzoic acid and reduced APM to be as sweet as the 100% APM control composition as well as having acceptable quality.

EXAMPLE 4

As a control, a mixed fruit gelatin is prepared by mixing 5.16 gms of an unsweetened gelatin base mix with 237 gms of water and 0.12 gm (0.050 wt.%) saccharin. The gelatin base contains an adipic acid and disodium phosphate buffer. The final gelatin has a pH of about 3.69.

For comparative purposes, a further mixed fruit gelatin is prepared by mixing 237 gms of water, 5.16 gms of the same unsweetened gelatin base mix as in the control, 0.09 gm saccharin (0.037 wt.%, which is 75% of the saccharin use in the control) and 0.07 gm (0.03 wt%) purified m-amino benzoic acid. The final gelatin has a pH of about 3.71.

For further comparison, another mixed fruit gelatin is prepared by mixing 237 gms of water, 5.16 gms of the same unsweetened gelatin base mix, 0.07 gm saccharin (0.029 wt.%, 60% of the saccharin in the control) and 0.24 gm (0.10 wt.%) of purified m-aminobenzoic acid. This formulation has a pH of about 3.74.

For additional comparison, a further mixed fruit gelatin is prepared by mixing 237 gms of water, 5.16 gms of the same unsweetened gelatin base mix, 0.05 gm saccharin (0.021 wt.%, 40% of the saccharin in the control) and 0.48 gm (0.2 wt.%) purified m-aminobenzoic acid. This formulation has a pH of about 3.75.

In evaluating and comparing the sweetness of the afore-described gelatin compositions, tasters assessed the sweetness of the gelatins containing the m-aminobenzoic acid and reduced saccharin to be as sweet as the 100% saccharin control composition as well as having acceptable quality.

EXAMPLE 5

As a control, a ready-to-drink cola containing about 10.6 wt.% sucrose is prepared by mixing 79.45 gms sucrose, 49.8 gms water, 3.6 gms cola concentrate and 617.1 gms salt free club soda. The final cola has a pH of about 2.6.

For comparative purposes, a further ready-to-drink cola beverage is prepared by admixing 97.5 gms water, 31.78 gms sucrose (4.2 wt.% sucrose, 40% of the control), 3.6 gms cola concentrate, 0.2 wt.% m-aminobenzoic acid and 617.1 gms salt free club soda. This cola has a pH of about 3.4.

In evaluating and comparing the sweetness of the afore-described cola beverages, tasters assessed the sweetness of the beverage containing the m-aminobenzoic acid and reduced sucrose to be as sweet as the 100% sucrose control cola as well as having acceptable quality.

EXAMPLE 6

As a control, a ready-to-drink cola containing about 0.035 wt.% saccharin is prepared by mixing 0.44 gms saccharin, 215.0 gms water, 6.1 gms cola concentrate and 1028.5 gms salt free club soda. The final cola has a pH of about 2.8.

For comparative purposes, a further ready-to-drink cola beverage is prepared by admixing 117 gms water, 0.11 gm saccharin (0.014 wt.% saccharin, 40% of the control), 3.6 gms cola concentrate, 0.2 wt.% m-aminobenzoic acid and 1028.3 gms salt free club soda. This cola has a pH of about 3.4.

In evaluating and comparing the sweetness of the afore-described cola beverages, tasters assessed the sweetness of the beverage containing the m-aminobenzoic acid and reduced saccharin to be as sweet as the 100% saccharin control as well as having acceptable quality.

EXAMPLE 7

As a control, a lemon flavored beverage is prepared by mixing 8.1 gms unsweetened lemon beverage base mix with 875 gms of water and 0.39 gms (0.044 wt.%) APM. The lemon mix contains a citric acid, potassium citrate, and tricalcium phosphate buffer. The final aqueous mixture has a pH of about 2.9.

For comparative purposes, a further lemon flavored beverage is prepared by mixing 875 gms of water, 8.1 gms of the same unsweetened base mix as in the control and 0.156 gms APM (0.18 wt. %, which is 40% of the APM utilized in the control). The formulation has a pH of about 2.9.

For further comparison, another lemon flavored beverage is prepared by mixing 875 gms of water, 8.1 gms of the same unsweetened base mix, 0.156 gms APM (0.018 wt.%, 40% of the APM in the control) and 1.77 gms (0.2 wt.%) of purified m-aminobenzoic acid. This formulation has a pH of about 3.2.

In evaluating and comparing the sweetness of the afore-described lemon flavored beverage compositions, tasters assessed the sweetness of the beverages containing the 0.2 wt.% m-aminobenzoic acid and 40% of the APM used in the control to be as sweet as the 100% APM control composition as well as having acceptable quality. The same tasters assessed the 40% APM containing beverage with no m-aminobenzoic acid to be unacceptable.

Although the invention has been described by reference to some embodiments, it is not intended that the novel composition and process be limited thereby but that modifications thereof are intended to be included as falling within the broad spirit and scope of the foregoing disclosure and drawings and the following claims.

EXAMPLE 8

3-aminobenzoic acid (m-aminobenzoic acid) is added at varying levels to a flavored beverage at a pH of 3.5 containing 5 percent sucrose and evaluated by a panel of experts. The following results are observed, with 100 indicating the sweetness of a 5 percent solution of sucrose:

| Level of 3-aminobenzoic acid (% by weight of solution) | perceived level of sweetness |
| --- | --- |
| 0 | 100 |
| 0.05 | 300 |
| 0.20 | 800 |
| 0.82 | 1200 |

These experiments demonstrate the increased level of sweetness resulting from the addition of 3-aminobenzoic acid to the beverage. Further, the level of perceived sourness decreased substantially, mainly due to the increase in perceived sweetness. These data show that when 3-aminobenzoic acid is added to a foodstuff containing a sweetener the level of sweetener required to achieve a desired level of sweetness can be substantially reduced.

EXAMPLE 9

3-aminobenzoic acid is added at varying levels to a solution containing 0.017% by weight of saccharin and evaluated by a panel of experts. The following results are observed (wherein 100 is the sweetness of a 0.017% solution of saccharin judged to be equisweet to a 5% solution of sucrose):

| Level of 3-aminobenzoic acid (% by weight of solution) | perceived level of sweetness |
| --- | --- |
| 0 | 100 |
| 0.14 | 110 |
| 0.50 | 170 |

The saccharin is not present at a threshold level wherein the bitter aftertaste is evident. These data indicate that when 3-aminobenzoic acid is added to a foodstuff containing saccharin, the level of saccharin ordinarily required to achieve a desired level of sweetness (usually accompanied by after taste) can be substantially reduced, without onset of the bitterness of the saccharin.

What is claimed is:

1. An edible composition comprising
   an edible material,
   a food-acceptable sweetener for sweetening said edible material, other than m-aminobenzoic acid or a food-acceptable, non-toxic salt thereof, said sweetener being present in an amount sufficient to sweeten said edible composition and above 1 wt.% sucrose equivalents, and
   a sweetness-modifying agent selected from m-aminobenzoic acid, food-acceptable, non-toxic salts thereof, and mixtures thereof wherein the sweetness modifying agent is present in an amount from 0.01 to 0.4% by weight based on the consumed weight of said edible material, said edible composition having a pH of from 2 to 5.5.

2. The composition of claim 1 wherein said sweetness modifying agent comprises m-aminobenzoic acid.

3. The composition of claim 1 wherein said sweetness modifying agent comprises the calcium salt of m-aminobenzoic acid.

4. The composition of claim 1 wherein said food-acceptable sweetener is selected from sucrose, fructose, corn syrup solids, high fructose corn syrup, dextrose, xylitol, sorbitol, mannitol, acetosulfam, thaumatin, invert sugar, saccharin, thiophene saccharin, cyclamate, chlorosucrose, dihydrochalcone, hydrogenated glucose syrups, aspartame and other dipeptides, stevioside, glycyrrhizin or mixtures thereof.

5. The composition of claim 1 wherein said sweetener is present in said composition in amounts above 2 wt.% sucrose equivalents.

6. The composition of claim 1 wherein said sweetness modifying agent is present in an amount of from about 0.05 to about 0.2% by weight based on the consumed weight of said edible material.

7. A process of modifying the sweetness perception of edible material, said process comprising combining edible material, a food-acceptable sweetener for sweetening said edible material, other than m-aminobenzoic acid or a food-acceptable, non-toxic salt thereof, and a sweetness modifying agent selected from m-aminobenzoic acid, food-acceptable, non-toxic salts thereof, and mixtures thereof, to form a composition, said food-acceptable sweetener being present in an amount above 1 wt.% sucrose equivalents, said sweetness modifying agent being present in an amount from 0.01 to 0.4% by weight based on the consumed weight of said edible material, said composition having a pH of from 2 to 5.5.

8. The process of claim 7 wherein said sweetness modifying agent comprises m-aminobenzoic acid.

9. The process of claim 7 wherein said sweetness modifying agent comprises the calcium salt of m-aminobenzoic acid.

10. The process of claim 7 wherein said sweetener is present in said edible material in amounts above about 2 wt.% of sucrose equivalents.

11. The process of claim 7 wherein said food-acceptble sweetener is present in an amount from about 3 wt.% to about 15 wt.% sucrose equivalents.

12. The process of claim 7 wherein said food-acceptable sweetener is selected from sucrose, fructose, corn syrup solids, high fructose corn syrup, dextrose, xylitol, sorbitol, mannitol, acetosulfam, thaumatin, invert sugar, saccharin, thiophene saccharin, cyclamate, chlorosucrose, dihydrochalcone, hydrogenated glucose syrups, aspartame and other dipeptides, stevioside, glycyrrhizin or mixtures thereof.

13. A pre-mix composition capable, on dilution, of providing an edible composition having a pH of from 2 to 5.5, said pre-mix edible composition comprising:
    an edible material;
    a food-acceptable sweetener for sweetening said edible material, other than m-aminobenzoic acid or a food-acceptable, non-toxic salt thereof, in amount sufficient to sweeten said edible composition and above 1 wt.% sucrose equivalents; and
    a sweetness modifying agent selected from m-aminobenzoic acid, food-acceptable, non-toxic salts thereof, and mixtures thereof, said sweetness modifying agent being present in said pre-mix edible composition in an amount sufficient such that when said pre-mix edible composition is diluted to provide said edible composition, said sweetness modifying agent is present in said edible composition in an amount of from 0.01 to 0.4% by weight.

14. A pre-mix edible composition according to claim 13 wherein said sweetness modifying agent comprises m-aminobenzoic acid.

15. A pre-mix edible composition acording to claim 13 wherein said sweetness modifying agent comprises the calcium salt of m-aminobenzoic acid.

16. A pre-mix composition according to claim 13 wherein said food-acceptable sweetener is selected from sucrose, fructose, corn syrup solids, high fructose corn syrup, dextrose, xylitol, sorbitol, mannitol, acetosulfam, thaumatin, invert sugar, saccharin, thiophene saccharin, cyclamate, chlorosucrose, dihydrochalcone, hydrogenated glucose syrups, aspartame and other dipeptides, stevioside, glycyrrhizin or mixtures thereof.

* * * * *